(12) United States Patent
Arenburg et al.

(10) Patent No.: US 9,830,465 B2
(45) Date of Patent: Nov. 28, 2017

(54) STATEFUL DATA GEOFENCING

(71) Applicant: International Business Machines Corporation, Armonk, NY (US)

(72) Inventors: Robert T Arenburg, Round Rock, TX (US); Franck Barillaud, Austin, TX (US); Shivnath Dutta, Round Rock, TX (US); Alfredo V Mendoza, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/092,429

(22) Filed: Apr. 6, 2016

(65) Prior Publication Data
US 2016/0232367 A1    Aug. 11, 2016

Related U.S. Application Data

(63) Continuation of application No. 14/444,257, filed on Jul. 28, 2014, now Pat. No. 9,378,378.

(51) Int. Cl.
*H04L 29/00* (2006.01)
*G06F 21/62* (2013.01)
(Continued)

(52) U.S. Cl.
CPC .......... *G06F 21/6209* (2013.01); *G06F 21/60* (2013.01); *G06F 21/62* (2013.01);
(Continued)

(58) Field of Classification Search
CPC ... H04L 63/145; H04L 63/0245; H04L 51/12; H04L 51/06; H04L 51/38; H04L 67/04;
(Continued)

(56) References Cited

U.S. PATENT DOCUMENTS

| 7,729,995 B1 | 6/2010 | Alain et al. |
| 8,467,770 B1 | 6/2013 | Ben Ayed |

(Continued)

FOREIGN PATENT DOCUMENTS

EP    1187023 A1    3/2002

OTHER PUBLICATIONS

Amtel, Inc. Geofencing & Location Based Control, http://www.amtelnet.com/mobile-device-management/geofencing-security/, Last retrieved: May 9, 2014.

(Continued)

*Primary Examiner* — Don Zhao
(74) *Attorney, Agent, or Firm* — Kunzler Law Group; Steven Bennett

(57) ABSTRACT

An apparatus includes a boundary module that determines if a mobile device is within a secure area. The mobile device includes a computing device capable of connecting to a wireless network. The apparatus includes a download module that downloads a latest version of a file from a secure server to the mobile device in response to the boundary module determining that the mobile device has entered the secure area. The apparatus includes a copy module that copies the file from the mobile device to the secure server in response to the boundary module determining that the mobile device has left the secure area and a deletion module that deletes the file from the mobile device in response to determining that the mobile device has left the secure area and in response to having completed copying the file from the mobile device to the secure server.

15 Claims, 5 Drawing Sheets

(51) Int. Cl.
*G06F 21/60* (2013.01)
*H04W 4/02* (2009.01)
*H04W 12/06* (2009.01)
*G06F 21/88* (2013.01)
*H04L 29/06* (2006.01)
*H04W 12/08* (2009.01)

(52) U.S. Cl.
CPC ............ *G06F 21/88* (2013.01); *H04L 63/107* (2013.01); *H04W 4/021* (2013.01); *H04W 12/06* (2013.01); *H04W 12/08* (2013.01); *G06F 2221/2149* (2013.01)

(58) Field of Classification Search
CPC ..... H04L 63/107; G06F 21/56; G06F 21/562; G06F 21/565; G06F 21/60; G06F 21/62; G06F 21/6209; G06F 21/88; G06F 2221/2149; H04W 12/06; H04W 12/08; H04W 4/021
See application file for complete search history.

(56) References Cited

U.S. PATENT DOCUMENTS

| | | | |
|---|---|---|---|
| 8,510,825 | B2 | 8/2013 | Tarkhanyan et al. |
| 9,411,572 | B2* | 8/2016 | Luk |
| 2005/0159883 | A1 | 7/2005 | Humphries |
| 2006/0072144 | A1 | 4/2006 | Dowling |
| 2006/0238379 | A1 | 10/2006 | Kimchi |
| 2007/0032225 | A1 | 2/2007 | Konicek |
| 2007/0077925 | A1 | 4/2007 | Hiyama |
| 2008/0055154 | A1 | 3/2008 | Martucci |
| 2008/0140479 | A1* | 6/2008 | Mello ................ G06Q 30/0256 705/14.54 |
| 2009/0055091 | A1* | 2/2009 | Hines ................... G01C 21/30 701/408 |
| 2009/0170531 | A1* | 7/2009 | Hampel ............. H04L 12/5865 455/456.3 |
| 2010/0037323 | A1 | 2/2010 | Lemieux |
| 2010/0118025 | A1 | 5/2010 | Smith |
| 2010/0146600 | A1 | 6/2010 | Eldar |
| 2012/0047011 | A1* | 2/2012 | Rippetoe ............... G06Q 30/02 705/14.45 |
| 2012/0177010 | A1 | 7/2012 | Huang |
| 2012/0246731 | A1* | 9/2012 | Blaisdell ................ G06F 21/54 726/26 |
| 2012/0304310 | A1* | 11/2012 | Blaisdell ................ G06F 21/52 726/28 |
| 2013/0072226 | A1* | 3/2013 | Thramann ............ H04W 4/028 455/456.1 |
| 2013/0091452 | A1* | 4/2013 | Sorden .................... G06F 3/048 715/771 |
| 2013/0115972 | A1* | 5/2013 | Ziskind .................. H04W 4/02 455/456.2 |
| 2013/0297675 | A1* | 11/2013 | Li ........................... G09B 7/02 709/203 |
| 2014/0059695 | A1* | 2/2014 | Parecki .................. G06F 21/60 726/26 |
| 2014/0080521 | A1* | 3/2014 | Johnson ................. H04W 4/02 455/456.3 |
| 2014/0089913 | A1* | 3/2014 | Aaronson ................ G06F 8/62 717/174 |
| 2014/0266585 | A1 | 9/2014 | Chao |
| 2014/0310788 | A1 | 10/2014 | Ricci |
| 2015/0271156 | A1* | 9/2015 | Ronca ................ H04L 63/0876 713/168 |
| 2015/0355893 | A1* | 12/2015 | Luk .......................... G06F 8/62 717/178 |

OTHER PUBLICATIONS

AirWatch Mobile Content Management, Secure Content Collaboration, http://www.air-watch.com/solutions/mobile-content-management, Last retrieved May 9, 2014.

U.S. Appl. No. 14/444,257, filed Jul. 28, 2014, Office Action dated Aug. 13, 2015.

U.S. Appl. No. 14/444,257, filed Jul. 28, 2014, Final Office Action dated Jan. 5, 2016.

U.S. Appl. No. 14/444,257, filed Jul. 28, 2014, Notice of Allowance dated Mar. 31, 2016.

* cited by examiner

STATEFUL DATA GEOFENCING

FIELD

The subject matter disclosed herein relates to data protection and more particularly relates to protecting information downloaded to a mobile device from leaving a secure area.

BACKGROUND

Bring your own device ("BYOD") is fast becoming the norm for enterprise. Employees often may use their own mobile device and access company information from the mobile device. If access is granted to the employee to access company information on the mobile device, information may be left on the mobile device until the information is wiped off so there is no trace of the information. If a company has a policy that confidential information can only be viewed within the company offices or other secure area and confidential information of any sort is not to leave the premises, a problem could arise where residual confidential information can be left on the mobile device. When the employee that owns the mobile device leaves the company office or secure area, the confidential information may be taken outside the company office or secure area either by accident or intentionally.

BRIEF SUMMARY

An apparatus for protecting information is disclosed. A method and a computer program product also perform the functions of the apparatus. The apparatus includes, in one embodiment, a boundary module that determines if a mobile device is within a secure area. The mobile device includes a computing device capable of connecting to a wireless network. The apparatus, in one example, includes a download module that downloads a latest version of a file from a secure server to the mobile device in response to the boundary module determining that the mobile device has entered the secure area. The apparatus includes a copy module that copies the file from the mobile device to the secure server in response to the boundary module determining that the mobile device has left the secure area and a deletion module that deletes the file from the mobile device in response to the boundary module determining that the mobile device has left the secure area and in response to the copy module completing copying the file from the mobile device to the secure server.

In one embodiment, the apparatus includes a sync module that maintains a most current version of the file on the secure server, where the sync module overwrites a version of the file on the secure server with the file from the mobile device in response to determining that the file on the mobile device is a more current version of the file than the file on the secure server. In a further embodiment, the copy module copies the file from the mobile device to the secure server in response to the sync module determining that the version of the file on the mobile device differs from the version of the file on the secure server and/or the version of the file on the mobile device is a most current version of the file.

In another embodiment, the copy module does not copy the file from the mobile device to the secure server in response to the sync module determining that the version of the file on the mobile device is the same as the version of the file on the secure server or the version of the file on the mobile device is less current than a version of the file on the secure server. The deletion module deletes the file from the mobile device in response to the boundary module determining that the mobile device has left the secure area without the copy module copying file from the mobile device to the secure server. In another embodiment, the sync module synchronizes the file on the secure server and a version of the file on the mobile device with one or more versions of the file from other users.

In one embodiment, the boundary module uses global positioning system ("GPS") data from the mobile device to determine if the mobile device is within the secure area. In a further embodiment, the mobile device connects with the secure server wirelessly over a secured wireless network while the mobile device is in the secure area and the secured wireless network extends beyond the secure area and the copy module uses the secured wireless network to copy the file to the secure server after the boundary module has determined that the mobile device is not in the secure area.

In one embodiment, the boundary module uses signal strength data of a wireless connection between the mobile device and a secured wireless network where the secured wireless network connects the mobile device to the secured server while the mobile device is in the secure area. In a further embodiment, the boundary module determines that the mobile device is not in the secure area when the signal strength data indicates that the mobile device is not connected to the secured wireless network. In another embodiment, the copy module copies the file from the mobile device to the secure server using a wireless network independent from a wireless network available in the secure area. In a further embodiment, the wireless network independent from a wireless network available in the secure area includes a cellular network wherein the cellular network communicates with the secure server to copy the file from the mobile device to the secure server.

In one embodiment, the download module downloads the latest version of the file in response to the boundary module determining that the mobile device has entered the secure area and in response to a user of the mobile device providing a username and password. In another embodiment, the copy module copies the file and the deletion module deletes the file from the mobile device without input from a user of the mobile device.

A method for protecting information includes determining if a mobile device is within a secure area. The mobile device includes a computing device capable of connecting to a wireless network. The method, in one embodiment, includes downloading a latest version of a file from a secure server to the mobile device in response to determining that the mobile device has entered the secure area. The method, in one example, includes copying the file from mobile device to the secure server in response to determining that the mobile device has left the secure area, and deleting the file from the mobile device in response to determining that the mobile device has left the secure area and in response to completing copying the file from the mobile device to the secure server.

In one embodiment, the method includes maintaining a most current version of the file on the secure server, where maintaining a most current version of the file on the secure server includes overwriting a version of the file on the secure server with the file from the mobile device in response to determining that the file on the mobile device is a more current version of the file than the file on the secure server. In another embodiment, the file is copied from the mobile device to the secure server in response to determining that the version of the file on the mobile device differs from the version of the file on the secure server and/or the version of the file on the mobile device is a most current version of the file. In another embodiment, the file is not copied from the mobile device to the secure server in response to determining that the version of the file on the mobile device is the same as the version of the file on the secure server or the version of the file on the mobile device is less current than a version of the file on the secure server. The file is deleted from the mobile device in response to determining that the mobile device has left the secure area without copying file from the mobile device to the secure server.

In one embodiment, determining if a mobile device is within a secure area includes using global positioning system ("GPS") data from the mobile device to determine if the mobile device is within the secure area. In another embodiment, copying the file from the mobile device to the secure server includes using a wireless network independent from a wireless network available in the secure area.

A computer program product for protecting information includes a computer readable storage medium having program instructions embodied therewith where the program instructions are readable/executable by a processor to cause the processor to determine if a mobile device is within a secure area. The mobile device includes a computing device capable of a wireless connection to a network. The program instructions are readable/executable to download a latest version of a file from a secure server to the mobile device in response to determining that the mobile device has entered the secure area. The program instructions are readable/executable to copy the file to the secure server in response to determining that the mobile device has left the secure area and to delete the file from the mobile device in response to determining that the mobile device has left the secure area and in response to completing copying the file from the mobile device to the secure server.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
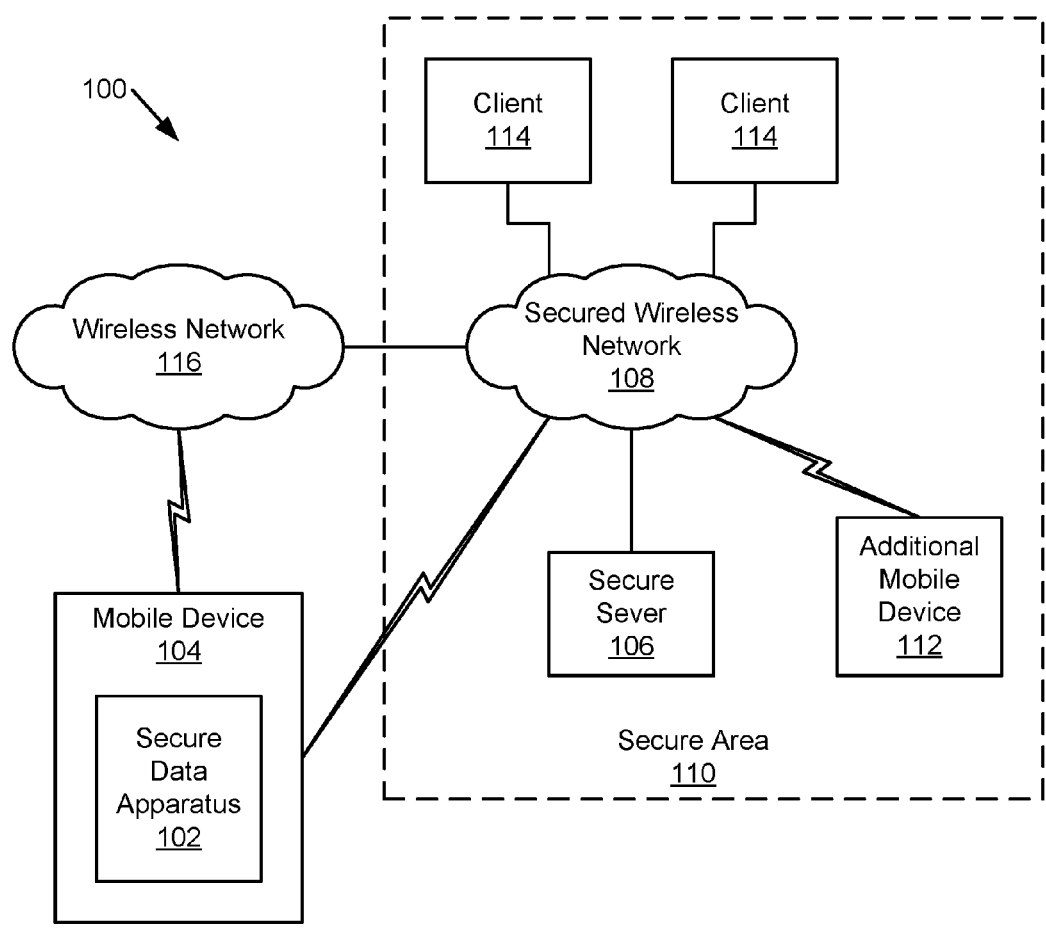
FIG. 1 is a schematic block diagram illustrating one embodiment of a system for protecting information in accordance with one embodiment of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

FIG. 1 is a schematic block diagram illustrating one embodiment of a system 100 for protecting information in accordance with one embodiment of the present invention. The system 100 includes a secure data apparatus 102, a mobile device 104, a secure server 106, a secured wireless network 108, a secure area 110, an additional mobile device 112, a client 114, and a wireless network 116, which are described below.

The system 100 includes a secure data apparatus 102. The secure data apparatus 102, in one embodiment, is in a mobile device 104. In other embodiments, at least a portion of the secure data apparatus 102 is in the secure server 106. In general, the secure data apparatus 102 copies a file from the secure server 106 to the mobile device 104 when the mobile device 104 enters the secure area 110 and then when the mobile device 104 leaves the secure area 110, the secure data apparatus 102 copies the file from the mobile device 104 to the secure server 106 and deletes the file from the mobile device 104. The secure data apparatus 102 is discussed in more detail in relation to the apparatus 200 of FIG. 2.

The system 100 includes a mobile device 104 that may include at least a portion of the secure data apparatus 102. The mobile device 104, in one embodiment, includes a processor or other logic to operate the secure data apparatus 102. For example the mobile device 104 may be a smartphone, a laptop computer, a tablet computer, or other mobile computing device capable of downloading and uploading a file over a wireless network and editing the file. The file may be a data file, a text file, a file created by a word processor, a graphic design program, a spreadsheet program, an application, etc. The file may be any file that may be downloaded and manipulated by a user. One of skill in the art will recognize other file types suitable for downloading to a mobile device 104 and that may be manipulated by a user.

The system 100, in one embodiment, includes a secure server 106 that includes data files of a sensitive nature. For example, the data files may be classified by a government, may include trade secret information, or may include sensitive information. The secure server 106, in one embodiment, provides access to the sensitive data files to users that are within a secure area 110. In one embodiment, the secure server 106 is within the secure area 110. In another embodiment, the secure server 106 is external to the secure area 110 but provides access to sensitive data to users within the secure area 110. The secure server 106 may be a mainframe computer, a workstation, a desktop computer, a laptop computer, or other computing device. In one embodiment, the secure server 106 is part of a network and the network may include other servers, clients, networking equipment, etc. The secure server 106, in one embodiment, stores one or more files on a data storage device, which may be within the secure server 106 or may be part of a storage area network, cloud storage, or the like. One of skill in the art will recognize other characteristics of a secure server 106.

The secure area 110 typically is a location with limited access to certain individuals. For example, a secure area 110 may require a security clearance for entrance, may be protected by security guards, may require a password, card key, or other mechanism for entry. The secure area 110 may include a room, multiple rooms, a building, a facility, etc. Typically a secure area 110 includes a physical boundary where entrance to the secure area 110 is controlled at the boundary. In one embodiment, boundaries of a secure area 110 are determined by a range of a secured wireless network 108, which may be in addition to a physical boundary. One of skill in the art will recognize other features and characteristics of a secure area 110.

The system 100 includes, in one embodiment, a secured wireless network 108 that connects the various devices, such as the mobile device 104, additional mobile devices 112, clients 114, and the like to the secure server 106. The secured wireless network 108 is available at one or more locations in the secure area 110. The secured wireless network 108 provides access to files on the secure server 106. Typically the secured wireless network 108 includes encryption, username and password access, and other security measures to restrict access to data on the secure server 106, mobile device 104, etc. The secured wireless network 108, in one embodiment, is part of a computer network that may connect devices using data cables or other wired data traffic means. The secured wireless network 108 may be a WiFi network, a BlueTooth® network, or some other wireless protocol. One of skill in the art will recognize other characteristics of a secured wireless network 108 that provides access to files on the secure server 106.

The system 100 may include one or more clients 114 located within or external to the secure area 110 that access files on the secure server 106. The clients 114 typically connect over a computer network, such as the secured wireless network 108, but may also connect through wired connections. Typically the clients 114 are allowed access to the secure server 106 using usernames and passwords over a connection that includes security measures, such as encryption.

In one embodiment, the system 100 includes a wireless network 116 that is independent from the secured wireless network 108 and that connects to the mobile device 104. For example, the wireless network 116 may provide a connection for the mobile device 104 to copy data to the secure server 106 when the mobile device 104 leaves the secure area 110. The wireless network 116, in one embodiment, is a cellular network. In another embodiment, the wireless network 116 may be a WiFi network or may communicate using another wireless protocol. In one embodiment, the wireless network 116 is part of a network of a vendor that provides telephone and/or data services to a user of the mobile device 104. In one embodiment, the wireless network 116 is in communication with the secure server 106, either directly, through a computer network, or through the secured wireless network 108, to allow the secure data apparatus 102 to copy the file on the mobile device 104 to the secure server 106. The wireless network 116 typically connects to the secure server 106 using a security protocol.

Figure 2:
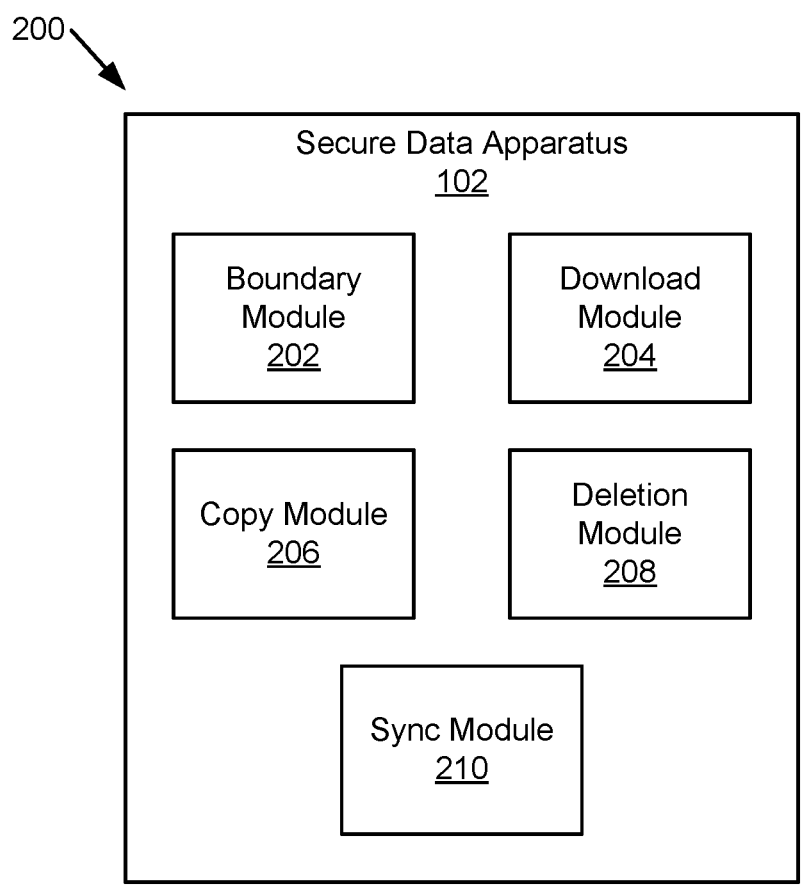
FIG. 2 is a schematic block diagram illustrating one embodiment of an apparatus for protecting information in accordance with one embodiment of the present invention.

FIG. 2 is a schematic block diagram illustrating one embodiment of an apparatus 200 for protecting information in accordance with one embodiment of the present invention. The apparatus 200 includes one embodiment of the secure data apparatus 102 with a boundary module 202, a download module 204, a copy module 206, and a deletion module 208, and in certain embodiments, a sync module 210. The modules 202-210 are described below.

The apparatus 200, in one embodiment, includes a boundary module 202 that determines if the mobile device 104 is within a secure area 110. The boundary module 202, in one embodiment, determines if the mobile device 104 enters or leaves the secure area 110. For example, the boundary module 202 may use data from a global positioning system ("GPS") and boundary information of the secure area to determine if the mobile device 104 is within the secure area 110. For example, the mobile device 104 may include a GPS function and the boundary module 202 may use GPS data from the GPS function of the mobile device 104.

In another embodiment, the boundary module 202 uses signal strength data of a wireless connection between the mobile device 104 and the secured wireless network 108. For example, the boundary module 202 may determine position information regarding the mobile device 104 relative to the secure area 110 based on the signal strength. In one instance, when signal strength decreases to a certain value the boundary module 202 may determine that the mobile device 104 is out of the secure area 110. In another embodiment, the system 100 may include one or more secured wireless networks 108 with a capability to track a location of a mobile device 104 and the boundary module 202 may use the tracking information from the one or more secured wireless networks 108 to determine if the mobile device 104 is in the secure area 110. For example, more than one secured wireless networks 108 may operate in a secure area 110 and may determine a position of the mobile device 104 using triangulation.

In another embodiment, the boundary module 202 may use information from one or more sensors within the secure area 110 to determine if the mobile device 104 is in the secure area 110. For example, a user of the mobile device 104 may include a badge that communicates with a sensor or the mobile device 104 may have a radio frequency identification ("RFID") tag or other device that communicates with a sensor. One or more sensors may track a location of the mobile device 104 and/or user of the mobile device 104 while within the secure area 110 or may track entry and exit of the mobile device 104 at a boundary of the secure area 110.

In one embodiment, the boundary module 202 includes a time delay or other mechanism to prevent false triggers for leaving the secure area 110 or to allow the mobile device 104 to temporarily exit the secure area 110. For example, where the boundary module 202 uses signal strength data for the secured wireless network 108, uses sensor data, GPS data, or other electronic mechanism that may temporarily lose connection or may have reduced signal strength, the boundary module 202 may include a time delay to allow reconnection, signal strength increase, etc. For example, if a user of the mobile device 104 enters an elevator in the secure area 110, the elevator may cause a reduction of signal strength between the mobile device 104 and the secured wireless network 108, a GPS system, etc.

In another embodiment, the boundary module 202 may allow the mobile device 104 to exit the secure area 110 for a short amount of time without making a determination that the mobile device 104 has left the secure area 110 for the purposes of copying the file from the mobile device 104 to the secure server 106. For example, the boundary module 202 may include a time limit that may allow for a water break, a bathroom break or other expected short-term exiting of the secure area 110. In another embodiment, the boundary module 202 may track the mobile device 104 to a location, for example to a known location such as a bathroom or water fountain or a certain distance from the secure area 110, without determining that the mobile device 104 has left the secure area 110. One of skill in the art will recognize other ways that the boundary module 202 may determine if the mobile device 104 is within the secure area 110 and other conditions for making a determination that the mobile device 104 is not in the secure area 110.

The apparatus 200, in one embodiment, includes a download module 204 that downloads a latest version of a file from a secure server 106 to the mobile device 104 in response to the boundary module 202 determining that the mobile device 104 has entered the secure area 110. In one embodiment, the download module 204 downloads a version of the file that is the same as when a user of the mobile device 104 last saved the file. The downloaded version of the file may be the same as when the mobile device 104 left the secure area 110 and the file was copied to the secure server 106. In another embodiment, the file is a version edited by the user remotely after the mobile device 104 exited the secure area 110. In another embodiment, the file is available to other users and the download module 204 downloads a version of the file that is a latest version based on edits from the user of the mobile device 104 as well as the other users.

In one embodiment, the download module 204 downloads the file automatically from the secure server 106 upon entry to the secure area 110. In another embodiment, the download module 204 downloads the file in response to a request for access by a user of the mobile device 104 and after the boundary module 202 determines that the mobile device 104 has entered the secure area 110. In another embodiment, the download module 204 downloads the file in response to a request for access by a user of the mobile device 104 and after the user enters a username and/or password. One of skill in the art will recognize other ways that the download module 204 may download the file from the secure server 106 in response to the mobile device 104 entering the secure area 110.

The apparatus 200, in one embodiment, includes a copy module 206 that copies the file from the mobile device 104 to the secure server 106 in response to the boundary module 202 determining that the mobile device 104 has left the secure area 110. In one embodiment, the copy module 206 copies the file over the secured wireless network 108. For example, the secured wireless network 108 may extend to an area outside the secure area 110 and may have enough signal strength outside the secure area 110 for the copy module 206 to use the secured wireless network 108 to copy the file.

In another embodiment, the copy module 206 copies the file over the secured wireless network 108 when the mobile device 104 is just inside a boundary of the secure area. For example, the copy module 108 may copy the file as the mobile device 104 is within a certain distance of an exit or within a certain distance of a boundary of the secure area 110. In another embodiment, the copy module 206 copies the file over the wireless network 116 that is independent of the secured wireless network 108. For example, the copy module 206 may use the wireless network 116 to copy the file from the mobile device 104 to the secure server 106 when the mobile device 104 is out of range of the secured wireless network 108.

The apparatus 200, in one example, includes a deletion module 208 that deletes the file from the mobile device 104 in response to the boundary module 202 determining that the mobile device 104 has left the secure area 110 and in response to the copy module 206 completing copying the file from the mobile device 104 to the secure server 106. In one embodiment, the deletion module 208 deletes the file immediately after the copy module 206 completes copying the file to the secure server 106. In another embodiment, the deletion module 208 uses a secure deletion method that prevents recovery of the file from the mobile device 104. For example, the deletion module 208 may copy over an area of memory in the mobile device 104 where the file was located prior to the deletion, or may use another deletion method that does not leave a trace of the file on the mobile device 104. One of skill in the art will recognize other ways for the copy module 206 and the deletion module 208 to first copy the file from the mobile device 104 to the secure server 106 and then delete the file from the mobile device 104.

In one embodiment, the apparatus 200 includes a sync module 210 that maintains a most current version of the file on the secure server 106, where the sync module 210 overwrites a version of the file on the secure server 106 with the file from the mobile device 104 in response to determining that the file on the mobile device 104 is a more current version of the file than the file on the secure server 106. In one embodiment, the copy module 206 copies the file to the secure server 106 and the sync module 210 determines if the file is the most current version prior to overwriting a copy of the file on the secure server 106. In another embodiment, the sync module 210 determines that the version of the file on the mobile device 104 is the most current version before the copy module 206 copies the file to the secure server 106.

In one embodiment, the copy module 206 copies the file from the mobile device 104 to the secure server 106 in response to the sync module 210 determining that the version of the file on the mobile device 104 differs from the version of the file on the secure server 106 and/or that the version of the file on the mobile device 104 is the most current version of the file. In another embodiment, the copy module 206 does not copy the file from the mobile device 104 to the secure server 106 in response to the sync module 210 determining that the version of the file on the mobile device 104 is the same as the version of the file on the secure server 106 or the version of the file on the mobile device 104 is less current than a version of the file on the secure server 106. In the case that the sync module 210 determines that the copy module 206 should not copy the file to the secure server 106, the deletion module 208 deletes the file from the mobile device 104 in response to the boundary module 202 determining that the mobile device 104 has left the secure area 110 and without the copy module 206 copying file from the mobile device 104 to the secure server 106.

In another embodiment, the sync module 210 also synchronizes the file on the secure server 106 and a version of the file on the mobile device 104 with one or more versions of the file from other users. For example, the mobile device 104 may leave the secure area 110 and the copy module 206 may then copy the file from the mobile device 104 to the secure server 106 and then another user may modify the file before the mobile device 104 again enters the secure area 110 and the download module 204 downloads the modified file from the secure server 106. In another example, the user of the mobile device 104 may modify the file while in the secure area 110 and later another user may modify the file. When the mobile device 104 leaves the secure area 110, the sync module 210 may not allow the copy module 206 to overwrite the file on the secure server 106 and, in one embodiment, may direct the copy module 206 to copy the version of the file on the mobile device 104 to another location on the secure server 106 instead of over the version on the secure server 106 modified by the other user. The sync module 210, in some embodiments, includes a version control system for naming versions of the file. One of skill in the art will recognize other features and functions of the sync module 210.

Figure 3:
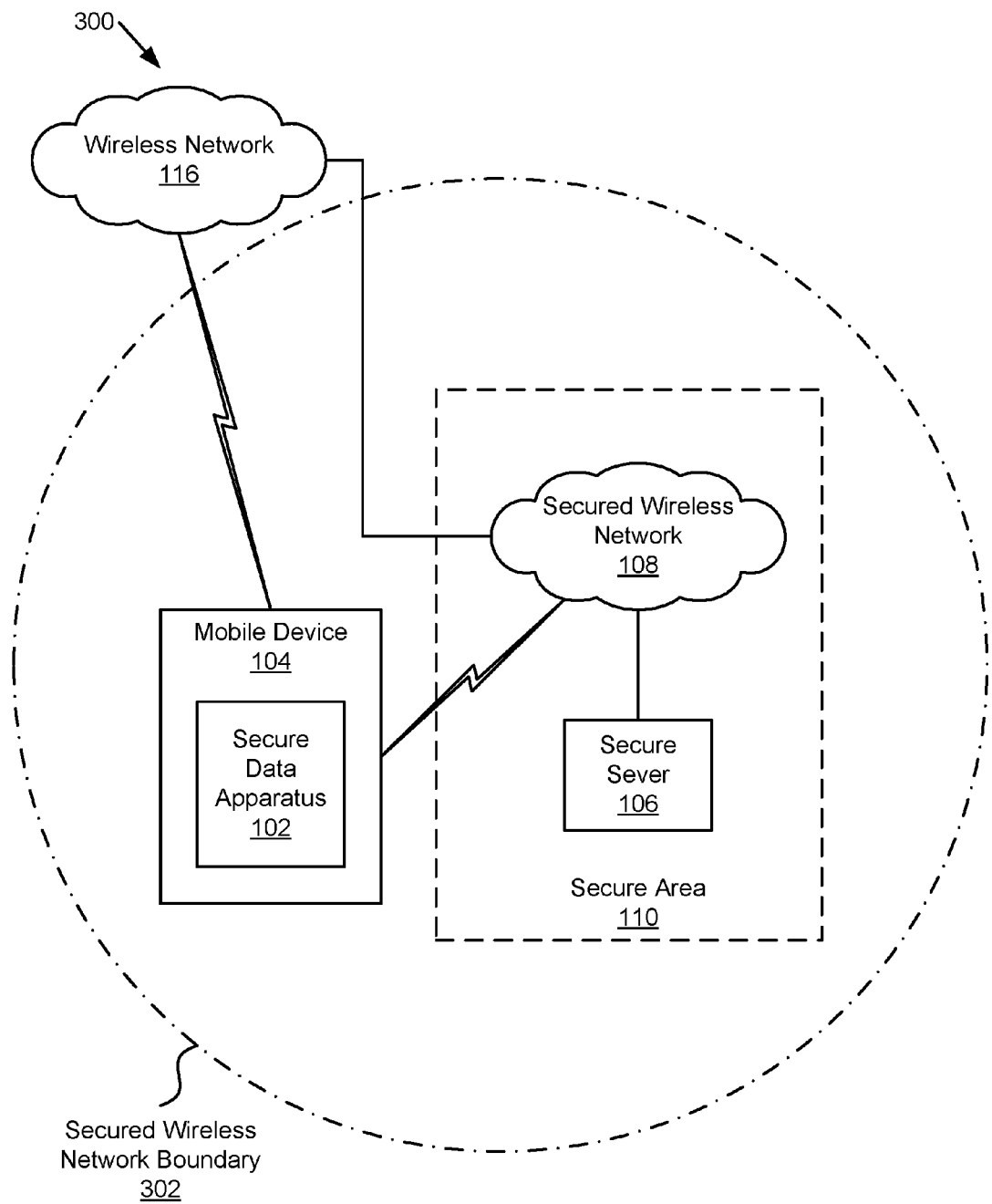
FIG. 3 is a schematic block diagram illustrating an alternate embodiment of a system for protecting information in accordance with one embodiment of the present invention.

FIG. 3 is a schematic block diagram illustrating an alternate embodiment of a system 100 for protecting information in accordance with one embodiment of the present invention. The system 100 includes an embodiment of a secure data apparatus 102, a mobile device 104, a secure server 106, a secured wireless network 108, a secure area 110, and a wireless network 116, which are substantially similar to those described above in relation to the system 100 of FIG. 1. In the embodiment, the secured wireless network 108 has a signal strength that extends beyond the secure area 110. In the embodiment, the when the boundary module 202 determines that the mobile device 104 is not in the secure area 110, the copy module 206 may copy the file from the mobile device 104 to the secure server 106 through the secured wireless network 108 instead of the wireless network 116. If the copy module 206 has not completed copying the file from the mobile device 104 to the secure server 106 before the mobile device 104 moves out of range of the secured wireless network 108, the copy module 206 may copy all or a portion of the file using the wireless network 116.

Figure 4:
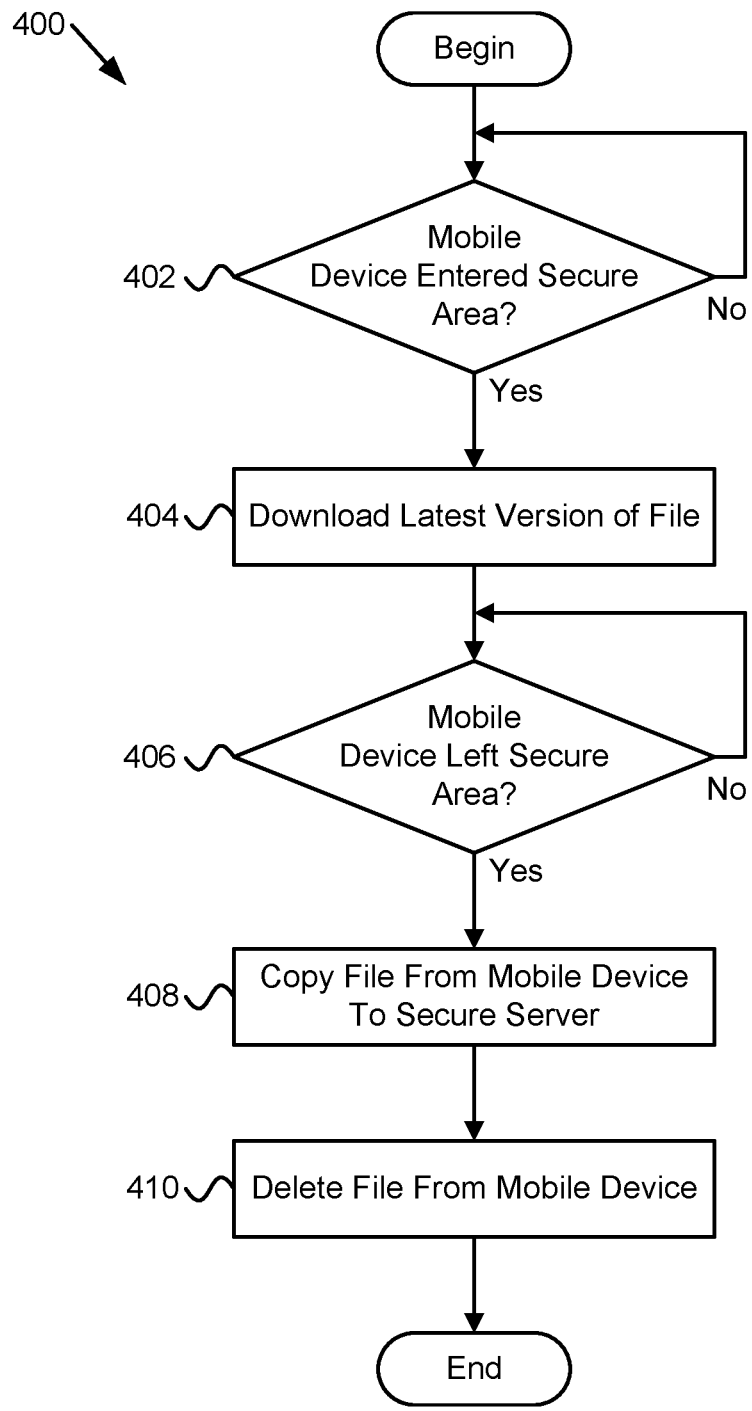
FIG. 4 is a schematic flow chart diagram illustrating one embodiment of a method for protecting information in accordance with one embodiment of the present invention.

FIG. 4 is a schematic flow chart diagram illustrating one embodiment of a method 400 for protecting information in accordance with one embodiment of the present invention. The method 400 begins and determines 402 if the mobile device 104 has entered the secure area 110. If the method 400 determines 402 that the mobile device 104 has not entered the secure area 110, the method 400 returns and continues to determine 402 if the mobile device 104 has not entered the secure area 110. If the method 400 determines 402 that the mobile device 104 has entered the secure area 110, the method 400 downloads 404 to the mobile device 104 the latest version of the file from the secure server 106. In one embodiment, the boundary module 202 determines 402 if the mobile device 104 has not entered the secure area 110 and the download module 204 downloads 404 to the mobile device 104 the latest version of the file from the secure server 106.

The method 400 determines 406 if the mobile device 104 has left the secure area 110. If the method 400 determines 406 that the mobile device 104 has not left the secure area 110, the method 400 continues to determine 406 if the mobile device 104 has left the secure area 110. If the method 400 determines 406 that the mobile device 104 has left the secure area 110, the method 400 copies 408 the file from the mobile device 104 to the secure server 106 and deletes 410 the file from the mobile device 104, and the method 400 ends. In various embodiments, the boundary module 202 may determine 406 if the mobile device 104 has left the secure area 110, the copy module 206 may copy 408 the file from the mobile device 104 to the secure server 106, and the deletion module 208 may delete 410 the file from the mobile device 104.

Figure 5:
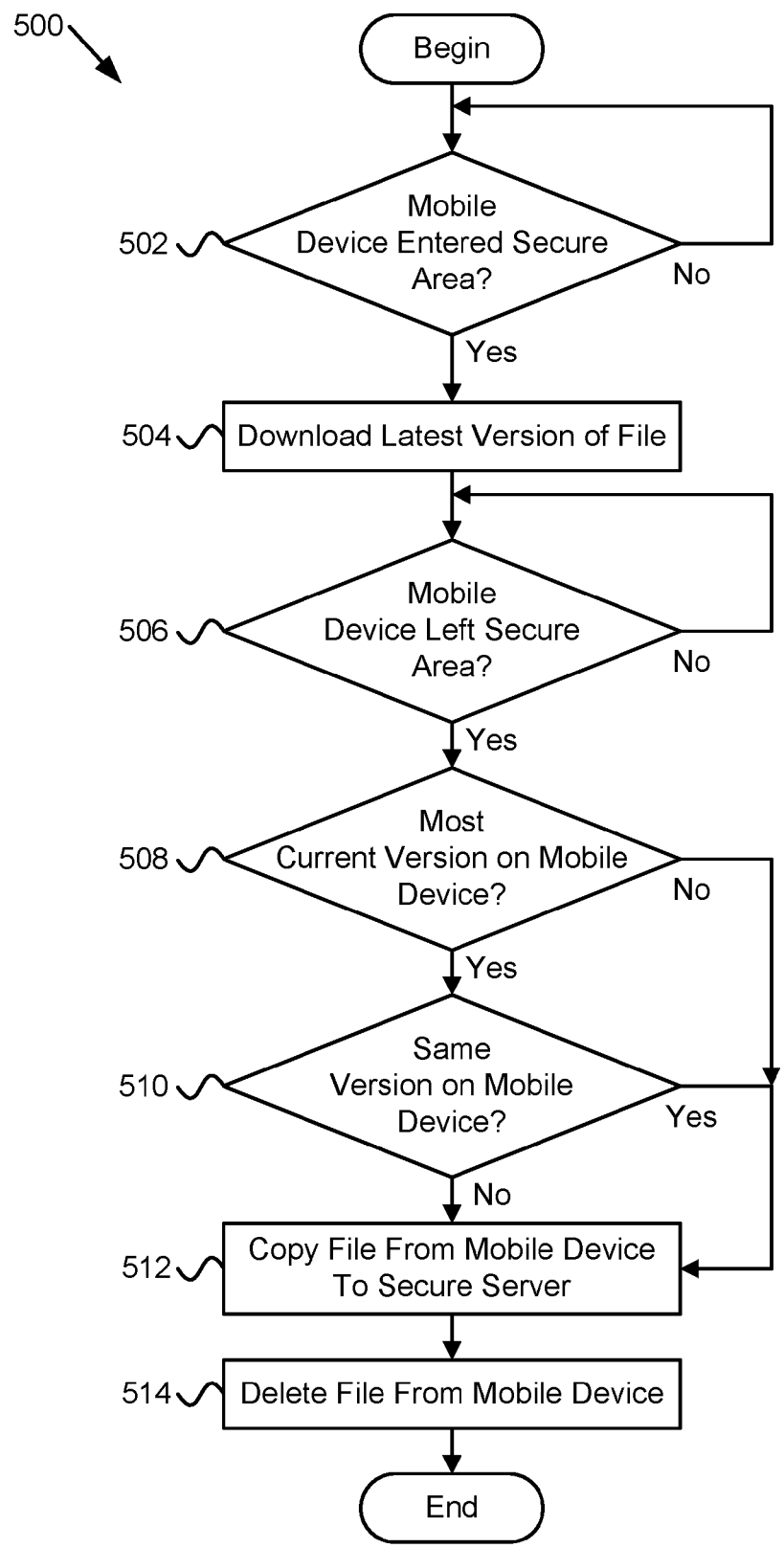
FIG. 5 is a schematic flow chart diagram illustrating another embodiment of a method for protecting information in accordance with one embodiment of the present invention.

FIG. 5 is a schematic flow chart diagram illustrating another embodiment of a method 500 for protecting information in accordance with one embodiment of the present invention. The method 500 begins and determines 502 if the mobile device 104 has entered the secure area 110. If the method 500 determines 502 that the mobile device 104 has not entered the secure area 110, the method 500 returns and continues to determine 502 if the mobile device 104 has not entered the secure area 110. If the method 500 determines 502 that the mobile device 104 has entered the secure area 110, the method 500 downloads 504 to the mobile device 104 the latest version of the file from the secure server 106. The method 500 determines 506 if the mobile device 104 has left the secure area 110. If the method 500 determines 506 that the mobile device 104 has not left the secure area 110, the method 500 continues to determine 506 if the mobile device 104 has left the secure area 110.

If the method 500 determines 506 that the mobile device 104 has left the secure area 110, the method 500 determines 508 if the version of the file on the mobile device 104 is a most current version. If the method 500 determines 508 that the version of the file on the mobile device 104 is a most current version, the method 500 determines 510 if the version of the file on the mobile device 104 is a same version as the file on the secure server 106. If the method 500 determines 510 that the version of the file on the mobile device 104 is not the same version as the file on the secure server 106, the method 500 copies 512 the file from the mobile device 104 to the secure server 106 and deletes 514 the file from the mobile device 104, and the method 500 ends. If the method 500 determines 508 that the version of the file on the mobile device 104 is not a most current version or if the method 500 determines 510 that the version of the file on the mobile device 104 is the same version as the file on the secure server 106, the method 500 deletes 512 the file from the mobile device 104, and the method 500 ends. In one embodiment, the sync module 210 determines 508 if the version of the file on the mobile device 104 is a most current version and the method 500 determines 510 if the version of the file on the mobile device 104 is a same version as the file on the secure server 106.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a boundary module, implemented by one or more hardware processors executing instructions, that determines if a mobile device communicatively coupled with the apparatus is within a secure area, the mobile device comprising a computing device capable of connecting to a secured wireless network;
a download module, implemented by the one or more hardware processors executing instructions, that downloads a latest version of a file from a secure server to the mobile device in response to the boundary module determining that the mobile device has entered the secure area, wherein the mobile device connects with the secure server wirelessly over the secured wireless network while the mobile device is in the secure area;
a copy module, implemented by the one or more hardware processors executing instructions, that copies the file including the latest version of the file from the mobile device to the secure server in response to the boundary module determining that the mobile device has left the secure area, wherein the copy module copies the file from the mobile device to the secure server using the secured wireless network available in the secure area, the secured wireless network extending beyond the secure area; and
a deletion module, implemented by the one or more hardware processors executing instructions, that deletes the file including all versions of the file from the mobile device in response to the boundary module determining that the mobile device has left the secure area and in response to the copy module having completed copying the file from the mobile device to the secure server,
wherein the copy module further completes the copying of the file from the mobile device to the secure server using a second wireless network in response to the mobile device traveling beyond the secured wireless network and the copying of the file from the mobile device to the secure server being incomplete, the second wireless network independent from the secured wireless network and extending beyond the secure area.

2. The apparatus of claim 1, the mobile device further comprising a sync module, implemented by the one or more hardware processors executing instructions, that maintains a most current version of the file on the secure server, wherein the sync module overwrites a version of the file on the secure server with the file from the mobile device in response to determining that the file on the mobile device is a more current version of the file than the file on the secure server.

3. The apparatus of claim 2, wherein the copy module copies the file from the mobile device to the secure server in response to the sync module determining that one or more of:
the version of the file on the mobile device differs from the version of the file on the secure server; and
the version of the file on the mobile device is a most current version of the file.

4. The apparatus of claim 2, wherein the copy module does not copy the file from the mobile device to the secure server in response to the sync module determining that one of:
the version of the file on the mobile device is the same as the version of the file on the secure server; and
the version of the file on the mobile device is less current than a version of the file on the secure server,
wherein the deletion module deletes the file from the mobile device in response to the boundary module determining that the mobile device has left the secure area without the copy module copying file from the mobile device to the secure server.

5. The apparatus of claim 2, wherein the sync module further synchronizes the file on the secure server and a version of the file on the mobile device with one or more versions of the file from other users.

6. The apparatus of claim 1, wherein the boundary module uses global positioning system ("GPS") data from the mobile device to determine if the mobile device is within the secure area.

7. The apparatus of claim 1, wherein the boundary module uses signal strength data of a wireless connection between the mobile device and the secured wireless network.

8. The apparatus of claim 1, wherein the download module downloads the latest version of the file in response to the boundary module determining that the mobile device has entered the secure area and in response to a user of the mobile device providing a username and password.

9. The apparatus of claim 1, wherein the copy module copies the file and the deletion module deletes the file from the mobile device without input from a user of the mobile device.

10. A method comprising:
determining if a mobile device is within a secure area, the mobile device comprising a computing device capable of connecting to a secured wireless network;
downloading a latest version of a file from a secure server to the mobile device in response to determining that the mobile device has entered the secure area, wherein the mobile device connects with the secure server wirelessly over the secured wireless network while the mobile device is in the secure area;
copying the file including the latest version of the file from mobile device to the secure server in response to determining that the mobile device has left the secure area, wherein copying the file including the latest version of the file from the mobile device to the secure server comprises using the secured wireless network available in the secure area, the secured wireless network extending beyond the secure area;
deleting the file including all versions of the file from the mobile device in response to determining that the mobile device has left the secure area and in response to having completed copying the file from the mobile device to the secure server; and
completing the copying of the file from the mobile device to the secure server using a second wireless network in response to the mobile device traveling beyond the secured wireless network and the copying of the file from the mobile device to the secure server being incomplete, the second wireless network independent from the secured wireless network and extending beyond the secure area.

11. The method of claim 10, further comprising maintaining a most current version of the file on the secure server, wherein maintaining a most current version of the file on the secure server comprises overwriting a version of the file on the secure server with the file from the mobile device in response to determining that the file on the mobile device is a more current version of the file than the file on the secure server.

12. The method of claim 11, wherein the file is copied from the mobile device to the secure server in response to determining that one or more of:
the version of the file on the mobile device differs from the version of the file on the secure server; and
the version of the file on the mobile device is a most current version of the file.

13. The apparatus of claim 11, wherein the file is not copied from the mobile device to the secure server in response to determining that one of:
the version of the file on the mobile device is the same as the version of the file on the secure server; and
the version of the file on the mobile device is less current than a version of the file on the secure server,
wherein the file is deleted from the mobile device in response to determining that the mobile device has left the secure area without copying file from the mobile device to the secure server.

14. The method of claim 10, wherein determining if a mobile device is within a secure area comprises using global positioning system ("GPS") data from the mobile device to determine if the mobile device is within the secure area.

15. A computer program product comprising a computer readable storage medium having program instructions embodied therewith, the program instructions readable/executable by a processor to cause the processor to:

determine if a mobile device is within a secure area, the mobile device comprising a computing device capable of connecting to a secured wireless network;
download a latest version of a file from a secure server to the mobile device in response to determining that the mobile device has entered the secure area, wherein the mobile device connects with the secure server wirelessly over the secured wireless network while the mobile device is in the secure area;
copy the file including the latest version of the file to the secure server in response to determining that the mobile device has left the secure area, wherein copying the file including the latest version of the file from the mobile device to the secure server comprises using the secured wireless network available in the secure area, the secured wireless network extending beyond the secure area;
delete the file including all versions of the file from the mobile device in response to determining that the mobile device has left the secure area and in response to having completed copying the file from the mobile device to the secure server; and
completing the copying of the file from the mobile device to the secure server using a second wireless network in response to the mobile device traveling beyond the secured wireless network and the copying of the file from the mobile device to the secure server being incomplete, the second wireless network independent from the secured wireless network and extending beyond the secure area.

* * * * *